(12) United States Patent
da Silva

(10) Patent No.: US 8,786,120 B2
(45) Date of Patent: Jul. 22, 2014

(54) HYDROELECTRIC GENERATOR HAVING WATER-FILLED GAP BETWEEN ROTOR AND STATOR

(75) Inventor: Othon Luiz Pinheiro da Silva, Barueri/SP (BR)

(73) Assignee: Aratec Engenharia Consultoria E Representacoes LTDA. (BR)

( * ) Notice: Subject to any disclaimer, the term of this patent is extended or adjusted under 35 U.S.C. 154(b) by 0 days.

(21) Appl. No.: 13/546,409

(22) Filed: Jul. 11, 2012

(65) Prior Publication Data

US 2012/0274071 A1 Nov. 1, 2012

Related U.S. Application Data

(62) Division of application No. 12/193,350, filed on Aug. 18, 2008, now Pat. No. 8,294,290.

(51) Int. Cl.
*F01D 15/10* (2006.01)
*F03B 13/00* (2006.01)
*H02K 21/12* (2006.01)

(52) U.S. Cl.
USPC .......................... 290/52; 290/54; 310/156.01

(58) Field of Classification Search
USPC .................. 290/52, 43, 54; 415/3.1; 60/641.7
See application file for complete search history.

(56) References Cited

U.S. PATENT DOCUMENTS

| | | | | |
|---|---|---|---|---|
| 2,634,375 A | * | 4/1953 | Guimbal | 290/52 |
| 4,367,413 A | * | 1/1983 | Nair | 290/52 |
| 4,740,711 A | * | 4/1988 | Sato et al. | 290/52 |
| 5,252,875 A | * | 10/1993 | Veronesi et al. | 310/114 |
| 7,102,249 B2 | * | 9/2006 | Wobben | 290/54 |
| 7,105,971 B2 | * | 9/2006 | Asai et al. | 310/156.53 |
| 8,294,290 B2 | * | 10/2012 | da Silva | 290/52 |

FOREIGN PATENT DOCUMENTS

JP 04334770 A * 11/1992 ............... F03B 7/00

OTHER PUBLICATIONS

USPTO Translation, JP 04-334770 A, Outer Ring Driving Type Hydraulic Turbine Generator, Nov. 20, 1992.*

* cited by examiner

*Primary Examiner* — John K Kim
*Assistant Examiner* — Thomas Truong
(74) *Attorney, Agent, or Firm* — Ronald E. Smith; Smith & Hopen, P.A.

(57) ABSTRACT

"IMPROVEMENT IN ELECTRICAL EQUIPMENT GENERATOR OF ELECTRICAL POWER", the invention herein refers to improvements in electrical power generating equipment which, due to the construction adopted, allows simplified maintenance at reduced frequency; in addition to useful application in several types of hydro electrical power plants, namely: micro, mini and small sized hydroelectric power plants.

10 Claims, 18 Drawing Sheets

HYDROELECTRIC GENERATOR HAVING WATER-FILLED GAP BETWEEN ROTOR AND STATOR

CROSS-REFERENCE TO RELATED APPLICATIONS

This application is a divisional of and claims priority to U.S. patent application Ser. No. 12/193,350, filed Aug. 18, 2008 by the same inventor and having the same title and said parent application is hereby incorporated into this application by reference.

TECHNICAL FIELD

The invention herein refers to improvements in electrical power generating equipment which, due to the construction adopted, allows simplified maintenance at reduced frequency; in addition to useful application in several types of hydro electrical power plants, namely: micro, mini and small sized hydroelectric power plants.

TECHNICAL FUNDAMENTALS

The state-of-the-art technology already acknowledges several types of hydro-electrical power generators with turbine and electrical generator coupled as well as integrated in a single equipment.

Usually, equipments with turbine and electrical generator integrated into single equipment present, as main inconvenience, the need for electrical field feeding in the generator rotor, which in turn, requires the adoption of auxiliary systems, such as excitement system, brushes, rings and collectors, consequently, turning the required complete rotor water tightness difficult.

One of the existent integrated hydroelectric power generators, known as Straffo turbine, presents the generator rotor assembled in the periphery of the propeller or Kaplan wheel.

The referred Straflo generator has as source of magnetic flux generated in the rotor, coils fed by external electrical current; therefore, having as constructive characteristics the need of mechanical seals or hydrostatic gasket joints, for water tightness preventing water from reaching the gap between the rotor and the stator, and the electrical parts of the rotor.

Another inconvenience observed in such turbine model consists of the fact that: inasmuch there is a need for transferring electrical power from foreign source to the rotor to generate useful magnetic flux per pole in the rotor, water tightness for the physical circuit that will perform such transfer becomes necessary.

Other generators applied to hydro electrical plants may be found in the state-of-the-art, such as document EP 1318299, where a turbine in bulb shape is foreseen, using a synchronous generator with permanent magnetic excitation with permanent magnetic poles, which are arranged in the generator rotor; the generator refrigeration is allowed only by the turbine flux which directs and promotes heat transfer of the bulb external surface. The document herein, although utilizing permanent magnetic excitement, presents complex constructive format, which turns its application unfeasible as an application of the present invention.

Document EP 0790696 refers to an electrical power generator, which presents one stator and one rotor, while the stator comprises some plurality of rectangular sectors where magnectical pole elements are disposed, being such arrangement applied to conventional generators, aiming at reducing the size of equipment, and avoiding some inconveniences found in the technique, however, it cannot be used in hydro electrics due to lack of water tightness and some other decurrent problems.

The applicant already holds the patent deposit for one integrated hydro generator, applied for as No. PI 0205233-4, having turbine and generator integrated and the generator rotor assembled to the external diameter of the turbine blades.

BRIEF DESCRIPTION OF THE OBJECT

In order to overcome inconveniences arising from current techniques, the invention herein has been developed focusing on a hydroelectric generator having a water-filled gap between its rotor and stator, more specifically applied to electrical power generation systems, allowing energy conversion elements to constitute a set composed of:
1. Hydraulic turbine: used for energy conversion from fluid mechanical into mechanical energy;
2. Generator: used for conversion of mechanical into electrical energy, composed of: Generator Stator and Generator Rotor.

The turbine power is directly transmitted to the electrical generator whenever the rotor with permanent magnets is assembled solidary to the turbine hub, or through a shaft that couples the turbine hub to the electric generator rotor.

The physical arrangement of the electrical energy generator equipment presents two main configurations, namely:

External Generator Stator, and Internal Generator Rotor, shown in pictures from 1 to 7, 9, 11 and 13, named as Version A; and Internal Generator Stator and External Generator Rotor, shown in pictures 8, 10, 12 and from 14 to 19 and named as Version B.

In both instances, the rotor with permanent magnets is assembled either solidarily to the turbine hub or by means of a shaft that couples the turbine cube to the electrical generator rotor.

Yet, the synchronous generator may have permanent magnets positioned in the generator rotor in two formats, namely:

Permanent magnets assembled on the rotor surface, shown in FIG. 3 for Version A and in FIG. 15 for Version B; and permanent magnets assembled, inserted in the rotor, shown in FIG. 4, for Version A and in FIG. 16 for Version B.

Resins, compound materials (either organic or metallic) or ceramics may be used in the capsulation of permanent magnets of the electrical generator rotor and stator, yet the capsulation option may be a combination of those materials listed.

The forms to obtain material encapsulation may be those performed by injection, immersion, dripping or by applying plates, ribbons, wires or blankets.

The hydraulic turbine and the generator are assembled in integrated format, with the electrical generator rotor directly coupled to the Propeller or Kaplan turbine hub (or cube), or to the equipment shaft, which can be formed by a single part or divided into sections interconnected by flanges, spools or sleeves, among others.

The hydraulic turbine can be Propeller or Kaplan type, and the electrical generator rotor with poles of permanent magnets is solidarily connected to its hub, or to the equipment shaft, being the shaft made either in one piece or divided into pieces connected by flanges, spools, sleeves, etc.

The turbine blades may possibly be adjusted during assemblage, or be controlled either by mechanisms or hydraulic systems, while the equipment shaft is applied for radial and longitudinal positioning of the turbine/generator set.

The hydraulic turbine hub may be cylindrical, spherical, elliptical, or any other shape that allows the pivoting of the hydraulic turbine blades, which means, the rotation motion around an axis perpendicular to the shaft of the solidary turbine/generator set.

When the blades of the hydraulic turbine are controllable, they will pivot in relation to the turbine hub.

Eventually, if permanent magnets of the electrical generator rotor are resistant to corrosion and abrasion, they may be non-encapsulated.

The electrical generator rotor can be encapsulated by resins, compound materials (either organic or metallic) or ceramics, as capsulation options, and in order to maintain water tightness, the capsulation option may be a combination of the above mentioned materials.

The application modes of capsulation materials may be by means of injection, immersion, dripping or applications per plates, bands, threads or blankets.

Eventually, permanent non-capsulated magnets resistant to corrosion and abrasion may be used, turning water tightness of the electrical generator rotor unnecessary, being such an option of the equipment physical arrangement.

One of the objectives of the present equipment is to propose that the rotor magnets of the electrical generator, whether encapsulated or not, remain immersed in water, therefore allowing water in the gap between the generator rotor and the generator stator (space between the electric generator rotor and the generator stator).

Another objective achieved with the construction of such electrical energy generator equipment is that, with the utilization of permanent magnets (5), either encapsulated or resistant to corrosion and abrasion, the electrical feeding is not necessary for the field of the electrical generator rotor, with consequent suppression of the excitation system, and also turning the water tightness between the electrical generator rotor and the equipment stationary parts and facilitating the equipment heat exchange.

Therefore, the Utility Model herein describes the equipment generator of electrical power as an innovative improvement applied to electrical systems for power generation, allowing the complete hydro-mechanic-electrical conversion in an integrated turbine/generator ensemble making use of permanent magnets, either capsulated or non-capsulated, with no need for electrical excitation system for the rotor of the electric generator; therefore, eliminating the need for water tightness, allowing presence of water in the gap between the generator rotor and the generator stator.

DESCRIPTION OF DRAWINGS

In order to complement the present description, aiming at clearly understanding the characteristics of such invention, and according to a preferential practical presentation of the hardware arising from the same, there are two sets of drawings divided into two groups related to the following versions:
1. Version A—External Generator Stator and Internal Generator Rotor
2. Version B—Internal Generator Stator and External Generator Rotor, Thus, in an exemplified rather than restrictive manner, the following is represented.

DETAILED DESCRIPTION OF THE OBJECT

Figure 1:
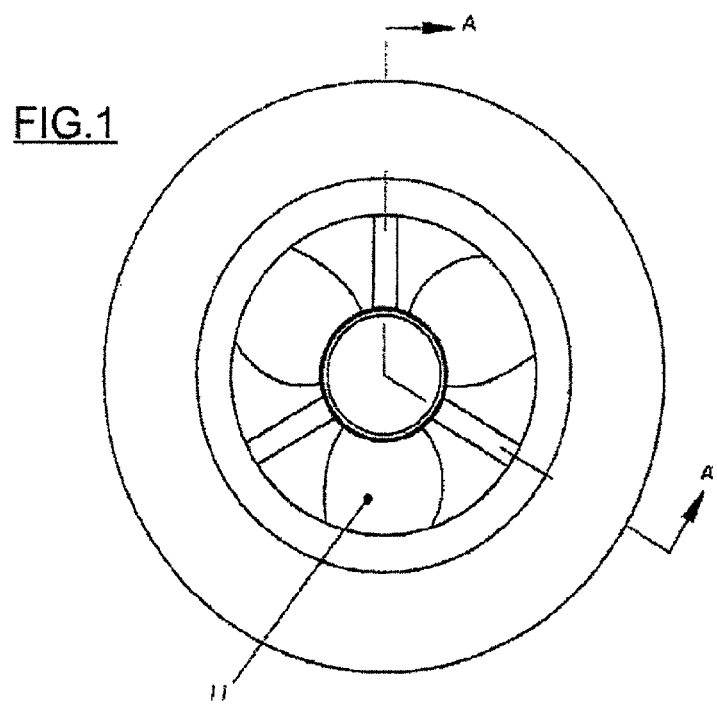
FIG. 1 illustrates a frontal view of the electrical power generator equipment (Version A) and that in particular presents the physical arrangement with the Propeller or Kaplan turbine type.
Figure 2:
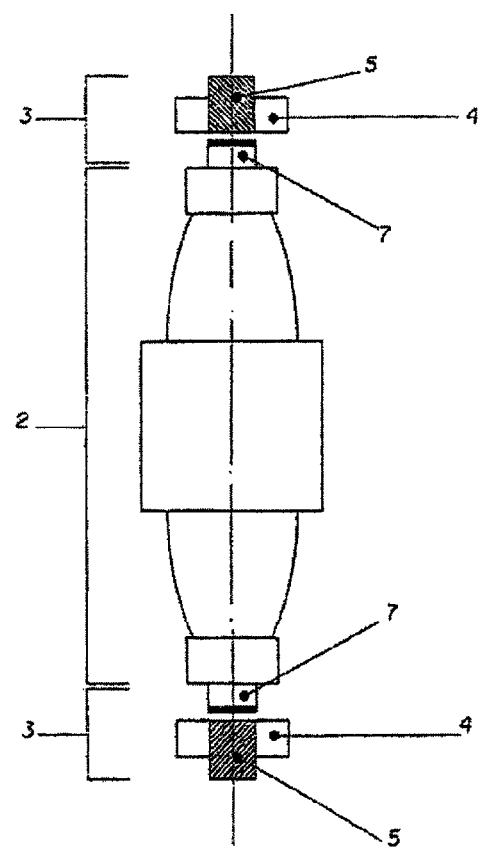
FIG. 2 shows a schematic and lateral view of the application for patent registration (application Number PI-0.205.233.4)

With reference to the illustrated drawings, the invention herein refers to a hydroelectric generator having a water-filled gap between its rotor and stator employed as generator of hydroelectric energy, synchronous generator type with permanent magnet poles (1), equipment composed of the following parts, namely (see FIGS. 7, 8, 9, 10, 11, 12, 13, 14,17,18 and 19):

1. Hydraulic turbine (2): used for fluid mechanical conversion into mechanical;
2. Electrical Generator (3) set composed of parts 1,4,5,7 and 10: used for mechanical conversion into electrical, which is composed of:
3. Generator stator (4)—Figures from 7 to 14,17, 18 and 19): encapsulated, however, similar to the electrical stators usually employed which, in its conception is composed of magnetic circuit, named Stator Ironwork (5) FIGS. 3 and 4) and multiphase winding (6) (FIGS. 3, 4, 15 and 16), placed in the stator grooves, distributed and shortened, aiming at by its peculiarities to confer the expected characteristics to the electrical output tension of the generator (3);
4. Generator rotor (7) Figures from 7 to 14, 17,18 and 19): composed of magnetic circuit, identified as "magnet rings" (8)—FIGS. 3, 4, 15 and 16) and poles (9) (FIGS. 3, 4, 15 and 16), of permanent magnets (1) (Figures from 7 to 14, 17,18 and 19), being the mentioned poles placed in the rotor (7) of the generator. Magnet ring 8 is mounted to and circumscribes the blades of the rotor.

Gap between stator and rotor (10) (Figures from 7 to 14, 17, 18 and 19): gap between the generator stator (4) and the generator rotor (7).

The generator stator (4) shall be totally encapsulated by resins, compound materials (either organic or metallic) or ceramics; the encapsulation option may be the combination of the aforementioned materials.

The application process for encapsulation materials may be by means of injection, immersion, dripping, or applications of plates, ribbons, threads or blankets.

Optionally, permanent magnets (1) of the generator rotor (7) may not be encapsulated, and in such situation permanent magnets shall be resistant to corrosion and abrasion.

The generator rotor (7) shall be encapsulated by resins, compound materials (organic or metallic), or ceramics that may be encapsulation options, yet the encapsulation option may also be a combination of the above mentioned materials, aiming at keeping water tightness of the generator rotor.

The generator rotor (7) is usually encapsulated and totally immersed in water, allowing the presence of water in the gap (10) between the generator rotor (7) and generator stator (4).

The application process for encapsulation materials of the generator rotor (7) and (3) may be obtained by means of injection, immersion, dripping, or applications of plates, ribbons, threads or blankets.

Figure 3:
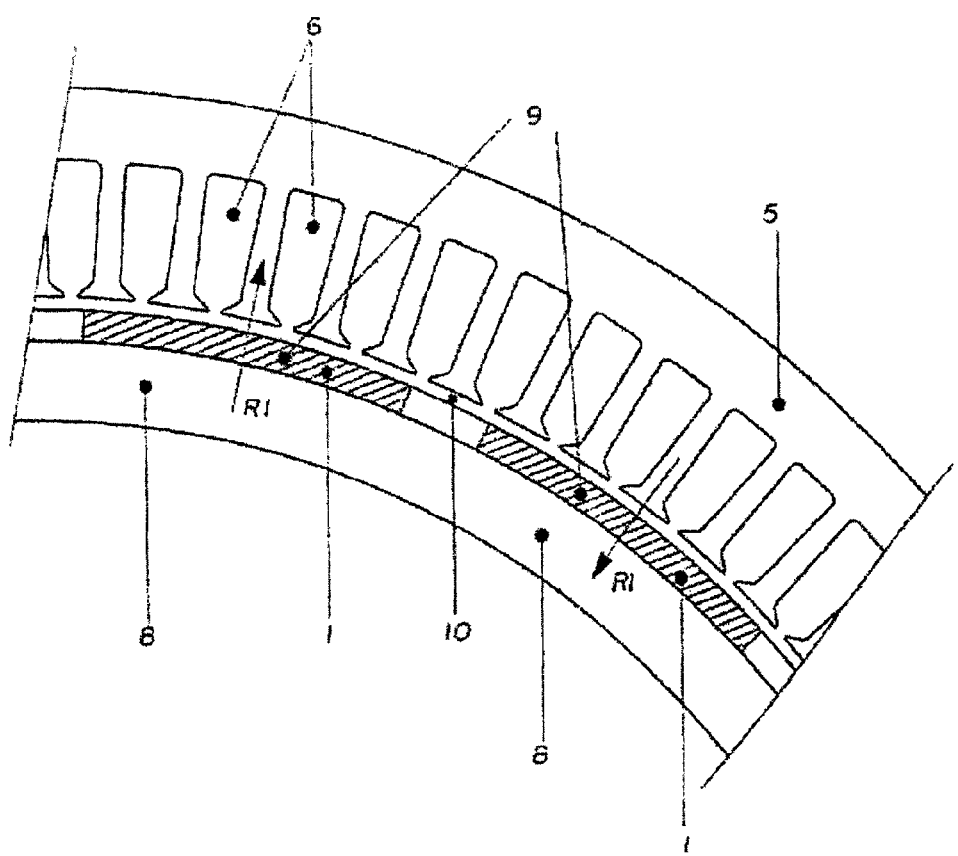
FIG. 3 is the illustration of the permanent magnets arrangement on the surface of the rotor generator.
Figure 4:
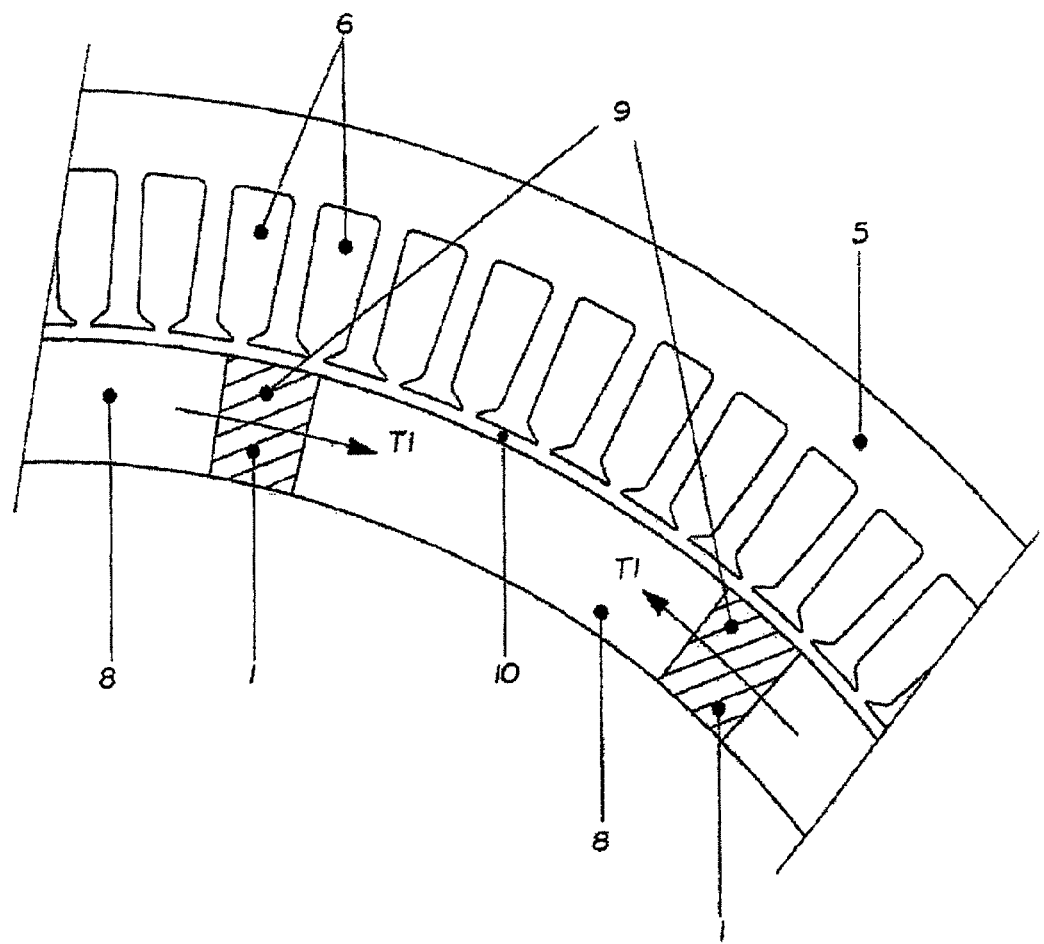
FIG. 4 is the illustration of permanent magnets arrangement inserted in the generator rotor.
Figure 5:
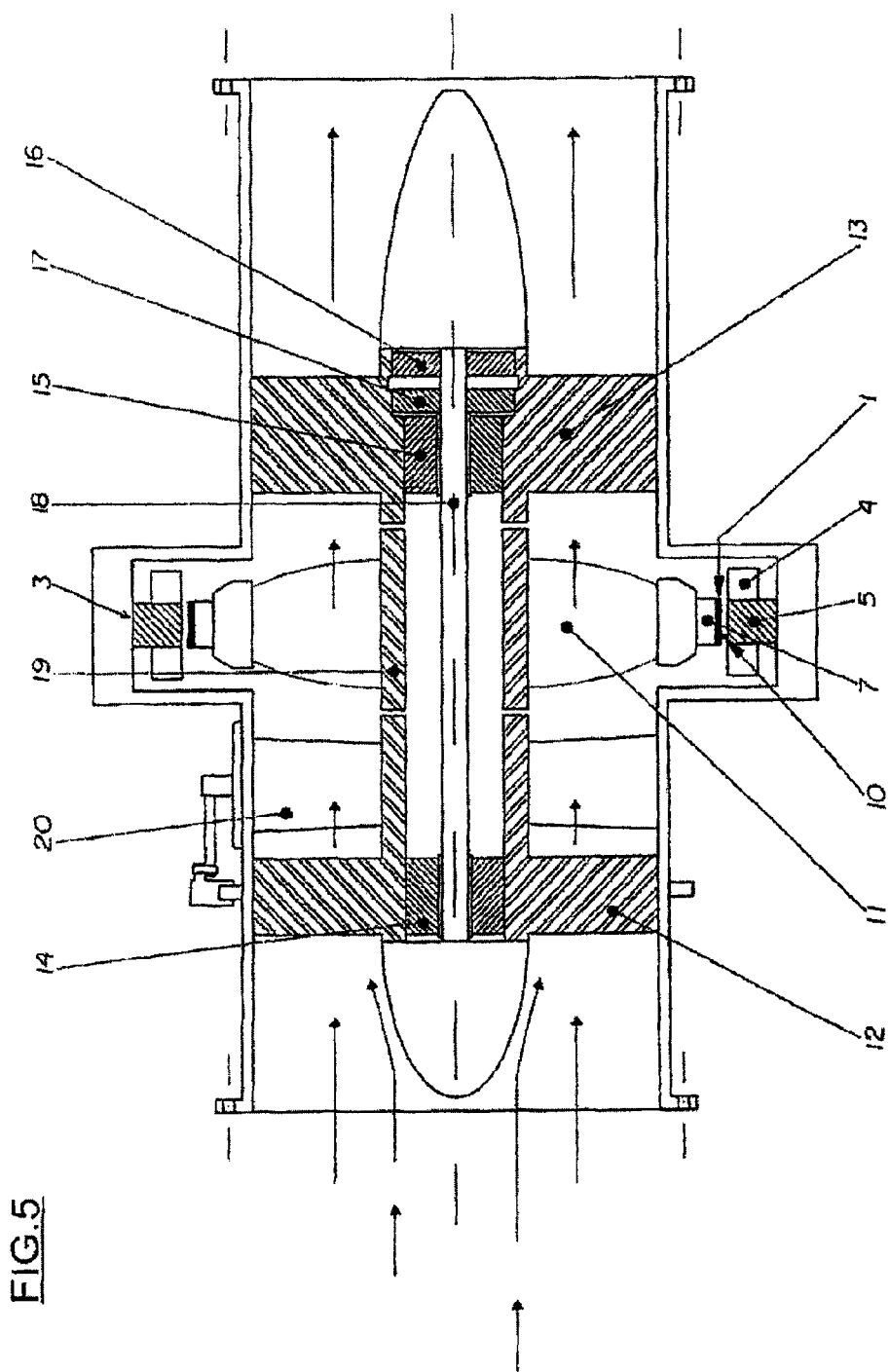
FIG. 5 represents a longitudinal cut from Case A1 equipment, illustrating the components assembled (application for patent registration No. PI-0.205.233-4)
Figure 6:
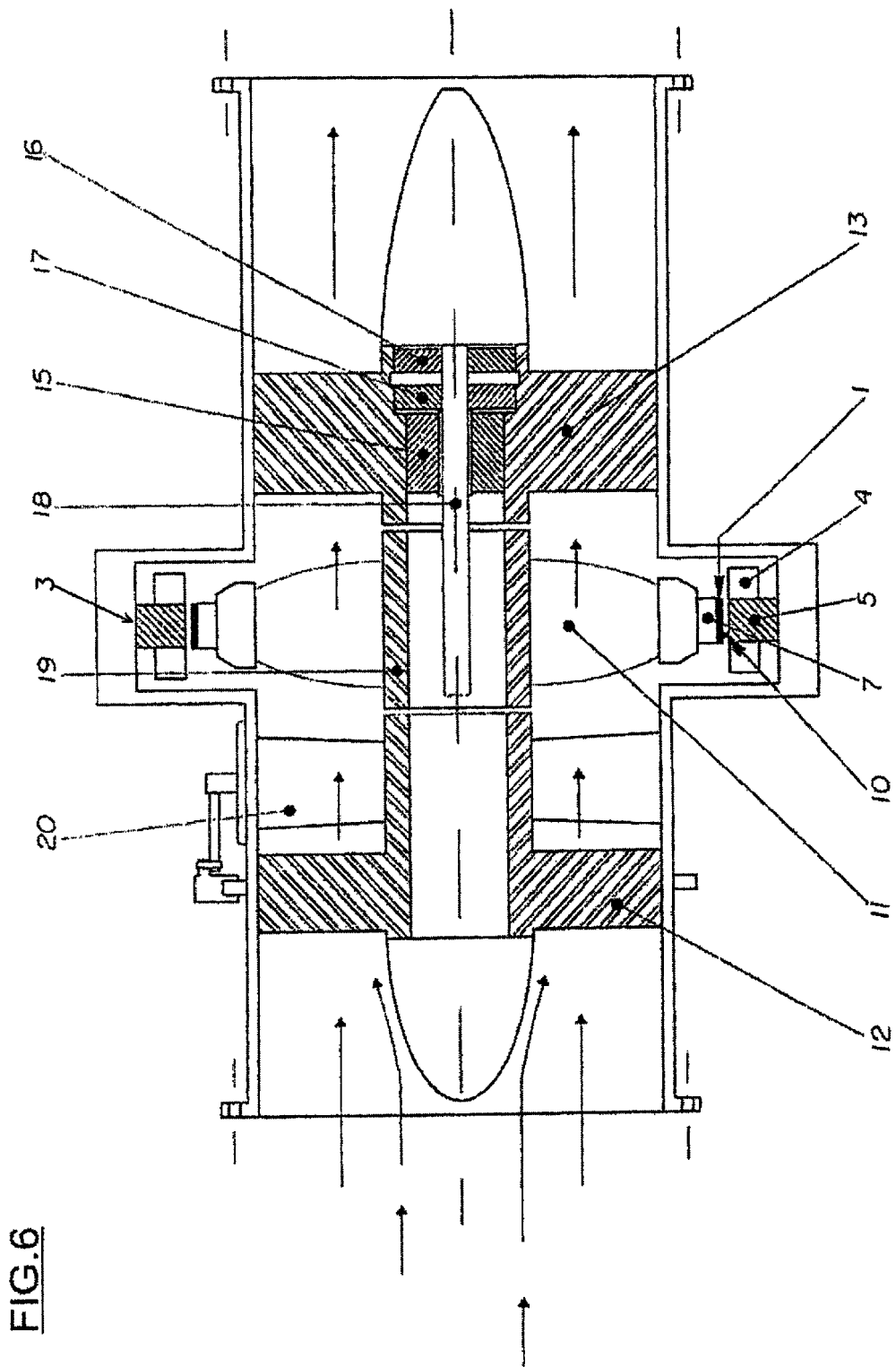
FIG. 6 represents a longitudinal cut from the equipment Case A2, illustrating the components assembled (application for patent registration number PI-0.205.233-4)
Figure 7:
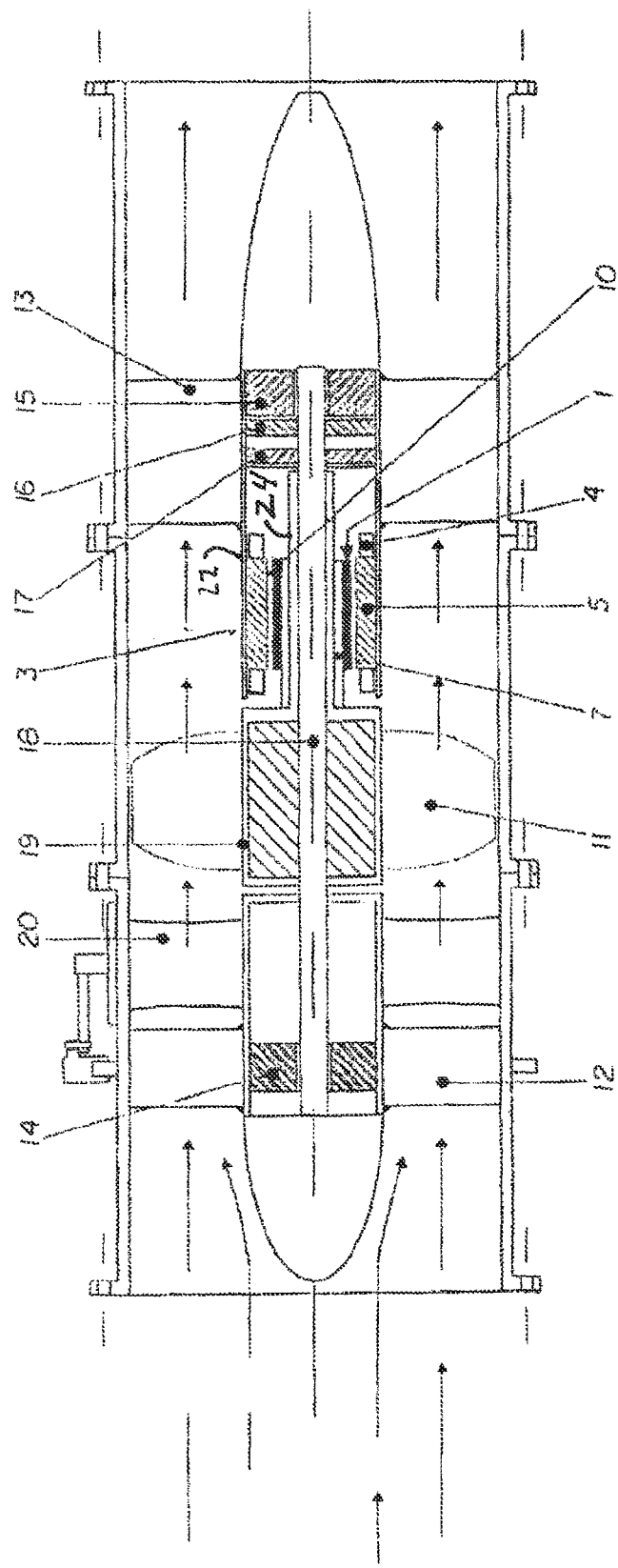
FIG. 7 represents a longitudinal cut of the equipment, illustrating the assembled components/Case B1: Set of turbine and electrical generator rotor bi-supported with the rotor of the electrical generator solidary with the turbine hub projection and with permanent magnets placed in the external diameter of the rotor electrical generator.
Figure 8:
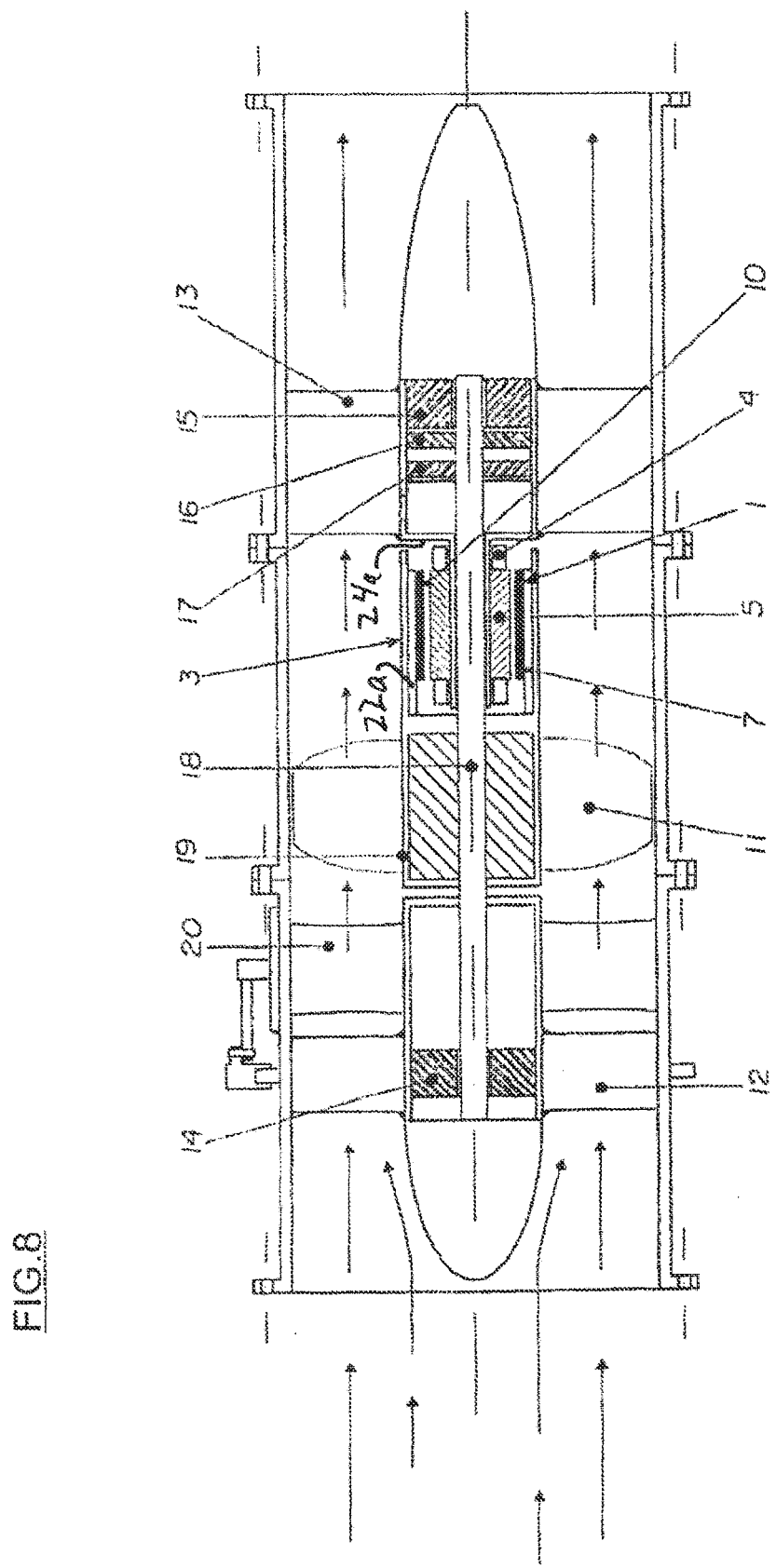
FIG. 8 represents a longitudinal cut of the equipment, illustrating the components assembled/Case B2: set of turbine and electrical generator rotor bi-supported, with rotor of the electric generator solidary to the extension of the turbine hub, and with permanent magnets placed in the internal diameter of the electrical generator rotor.
Figure 9:
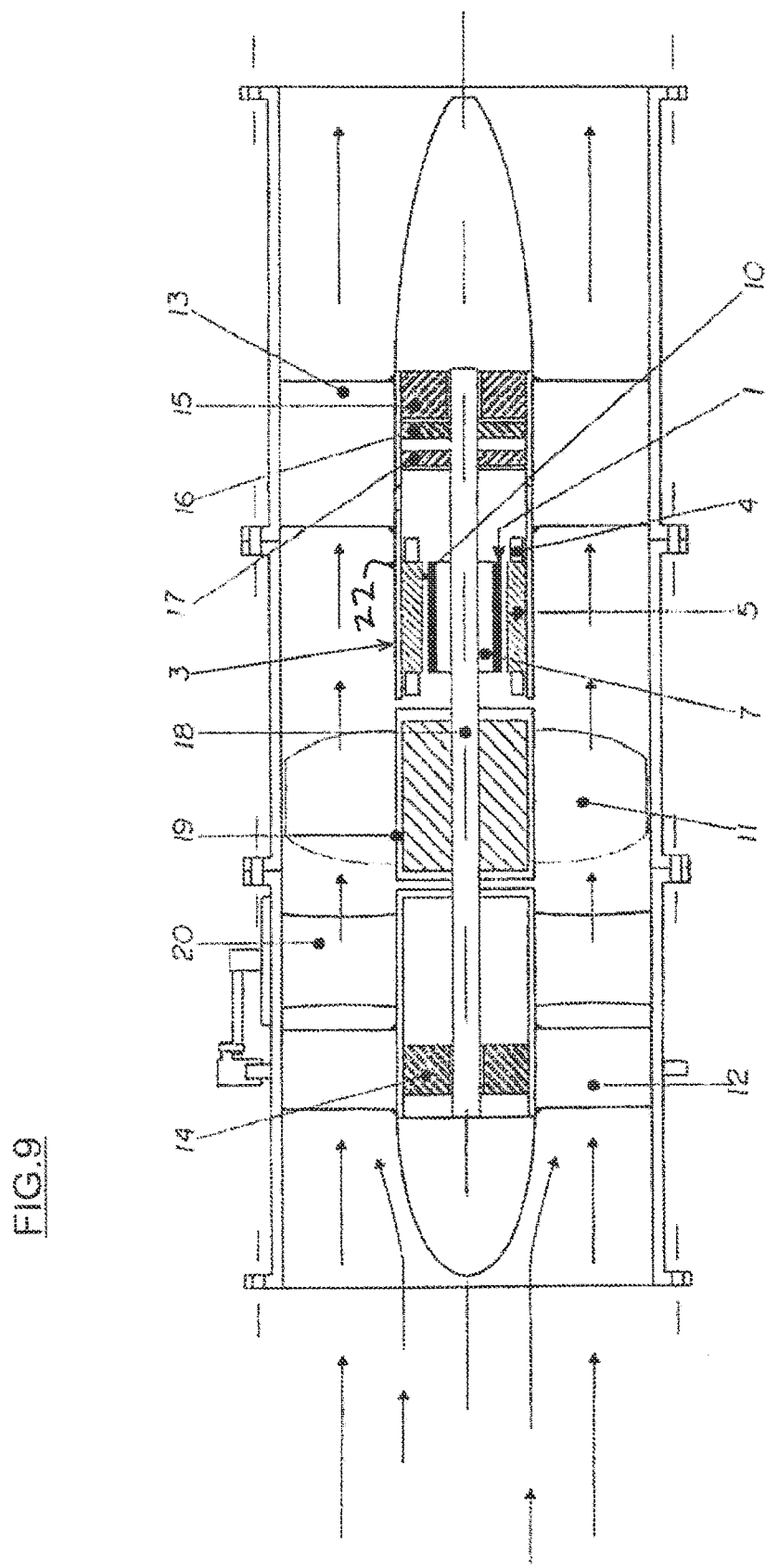
FIG. 9 represents a longitudinal cut of the equipment, illustrating the assembled components/Case B3: turbine and electrical generator rotor set bi-supported with the rotor of the electrical generator solidary to the equipment shaft, being the shaft either one single piece, or divided into sections interconnected by flanges, spools, sleeves, etc, and with permanent magnets in the external diameter of the electrical generator rotor.
Figure 15:
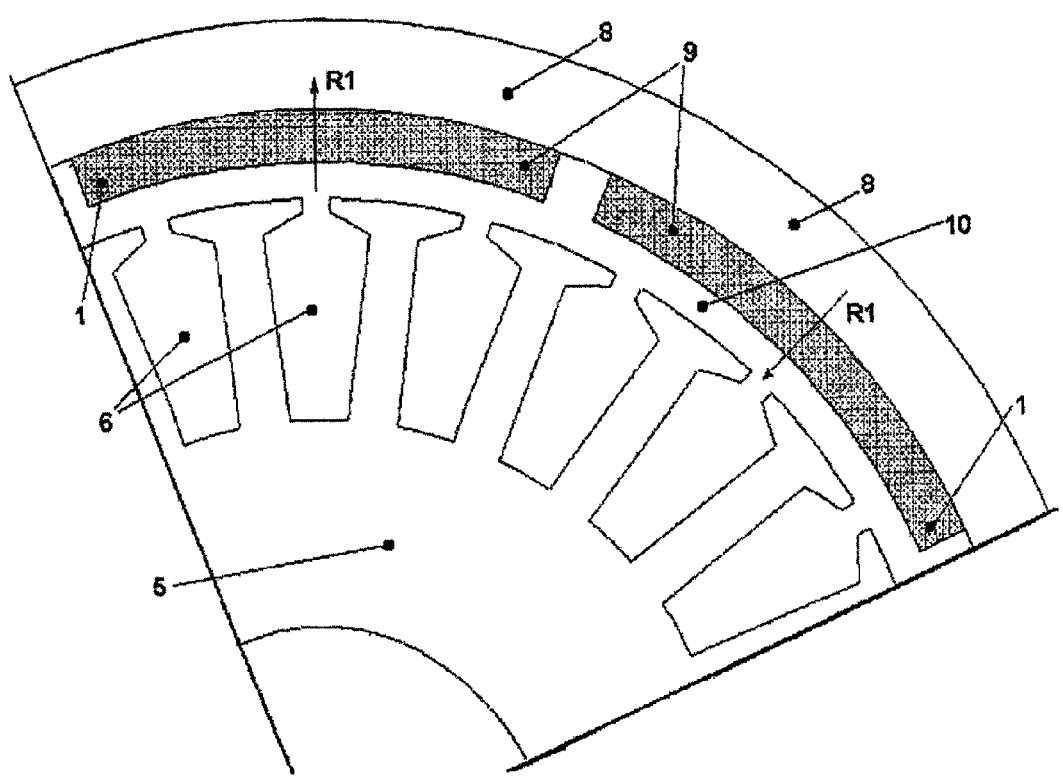
FIG. 15 represents the arrangement of permanent magnets on the surface of the generator rotor; in Version B.
Figure 16:
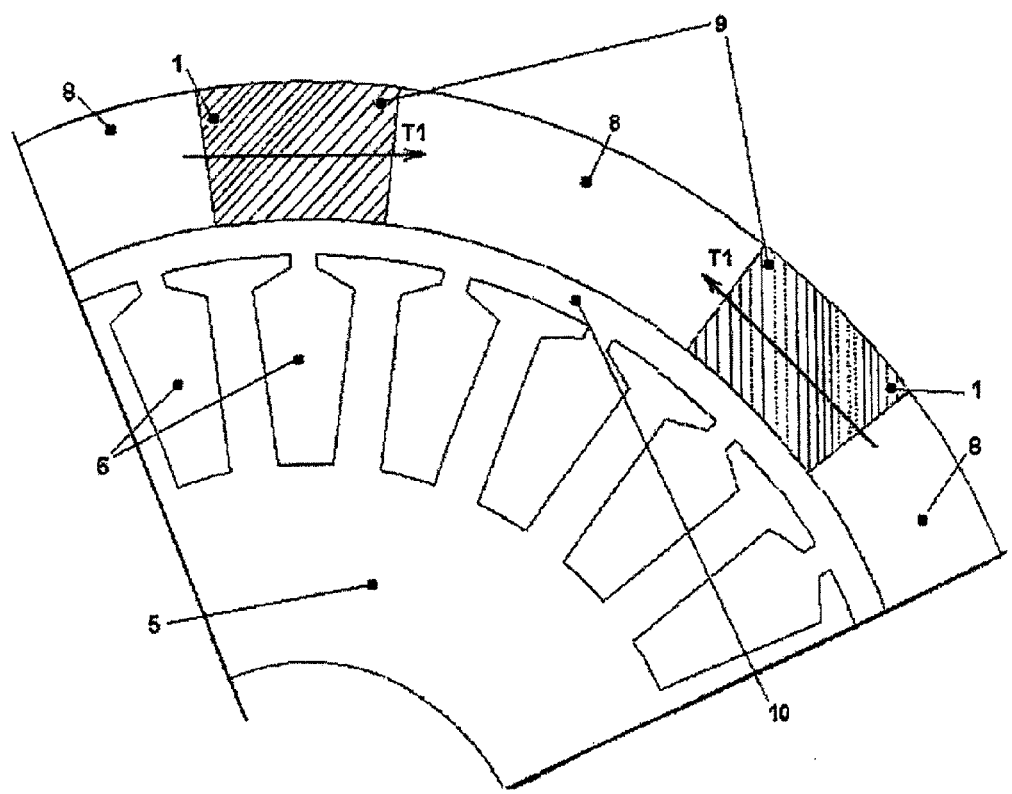
FIG. 16 represents the arrangement of permanent magnets inserted in the generator rotor.
Figure 17:
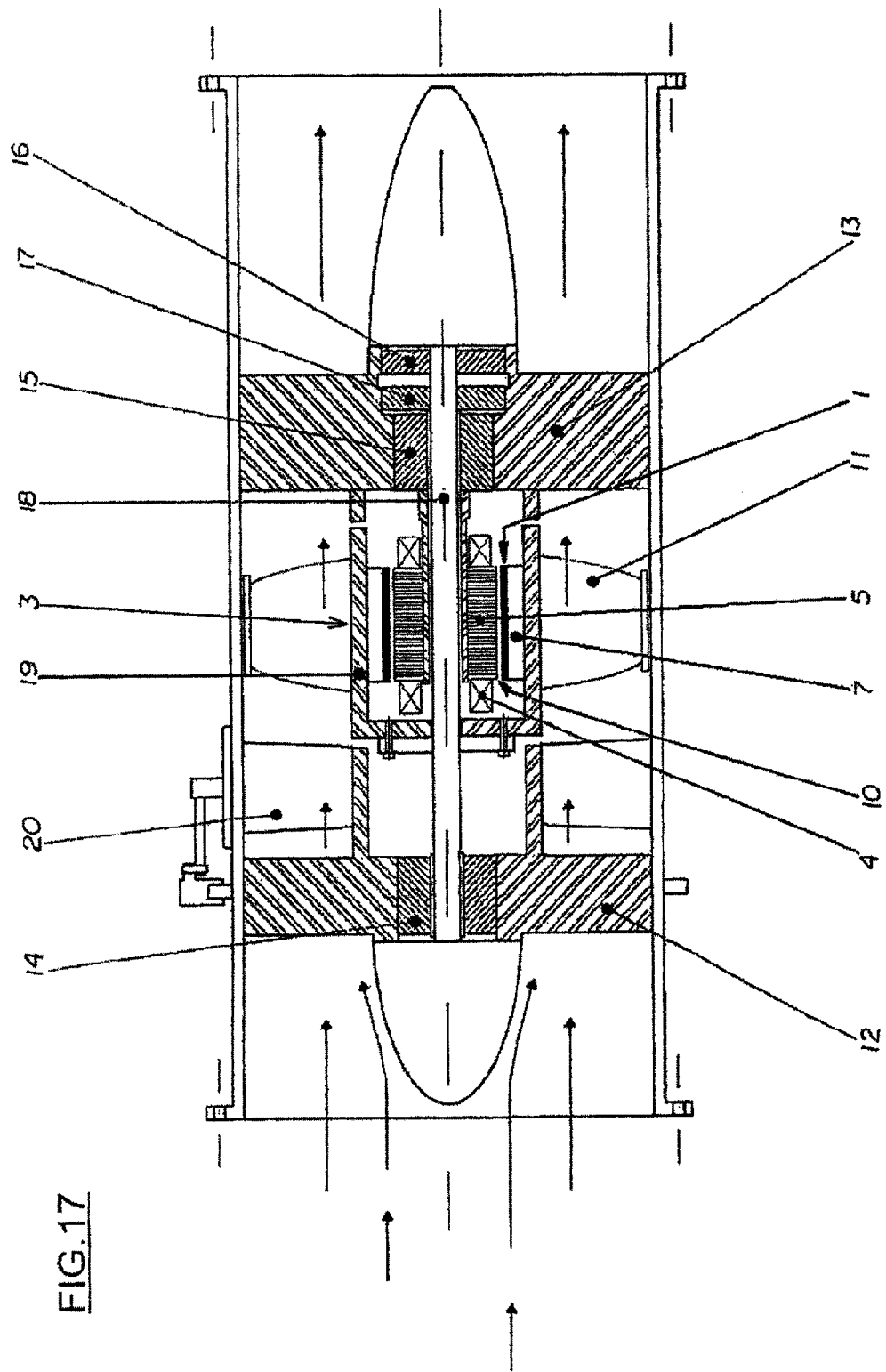
FIG. 17 represents a longitudinal cut of the equipment CASE C1.
Figure 18:
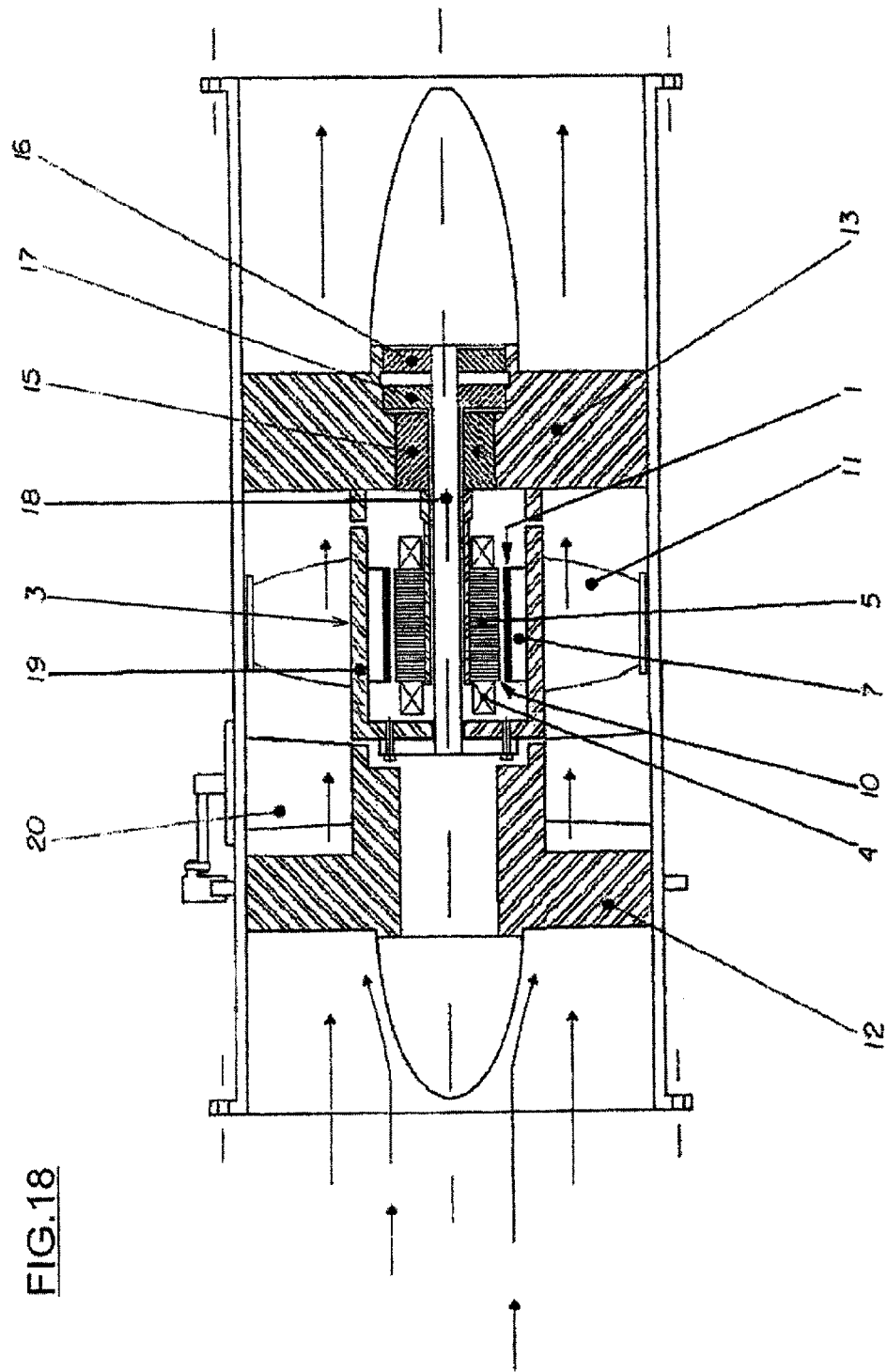
FIG. 18 represents a longitudinal cut of the equipment CASE C2.
Figure 19:
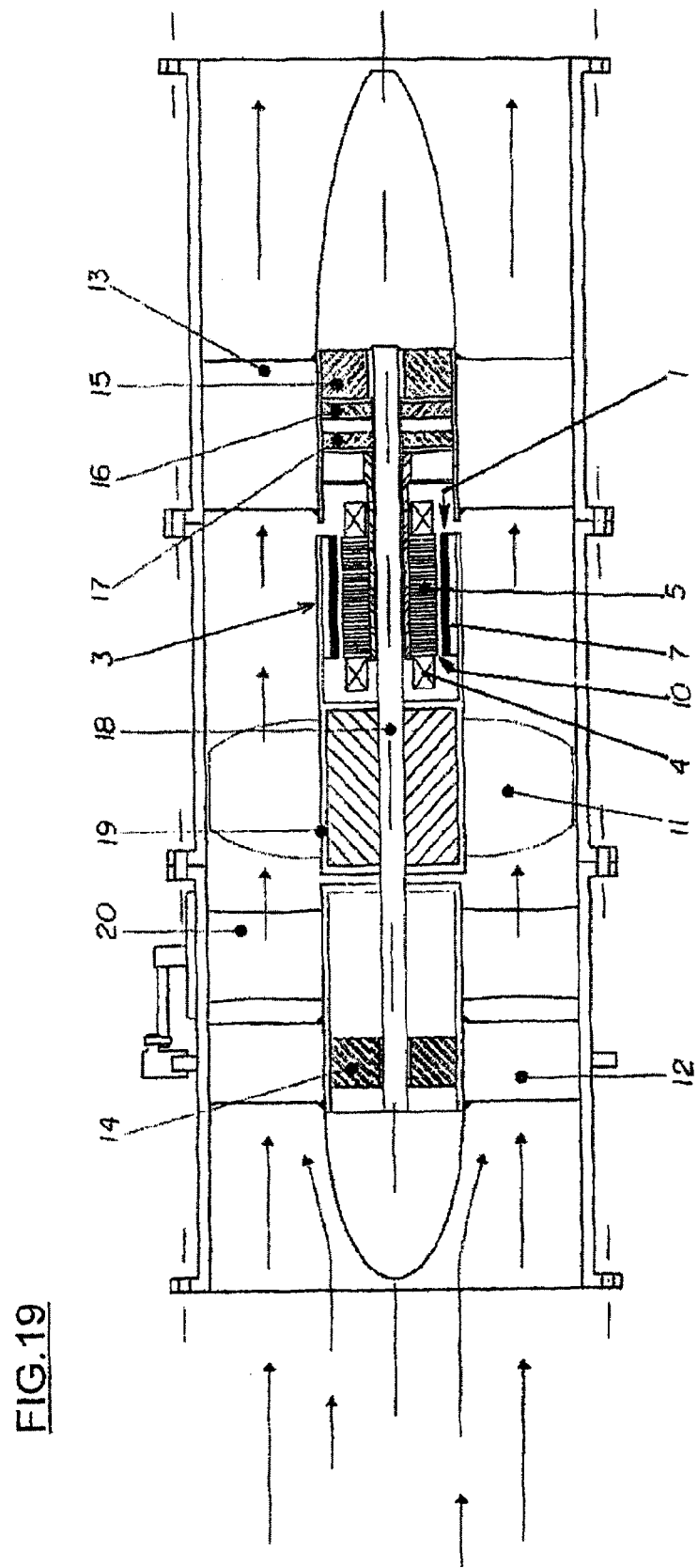
FIG. 19 represents a longitudinal cut of the equipment, illustrating the assembled components/CASE C3, (Version B). Turbine and electrical generator rotor set bi-supported with the electrical generator solidary to prolongation of the turbine hub.

The permanent magnets (1) placed in the generator rotor (7) act as excitation elements (generating the useful magnetic flux per pole), which can be assembled in the Rotor Iron in two ways:

Permanent magnets (1) at generator rotor surface (7), shown in FIGS. 3 and 15, with the magnetization of the permanent magnets in radial direction (R1); or Permanent magnets inserted in the Rotor Iron (8) as shown in FIGS. 4 and 16, where the Rotor iron (8) is previously prepared for the insertion of permanent magnets (1) leading to the magnetization of the permanent magnets (1) to tangential direction (T1)

The arrangement of permanent magnets (1) for every pole (9) may be formed either by only one piece of permanent magnet or by a composition of small pellets, conveniently displayed in the rotor surface or inserted in the rotor.

The Stator iron (5) and Rotor Iron may be made of any magnetic materials that better fits the project.

Figure 10:
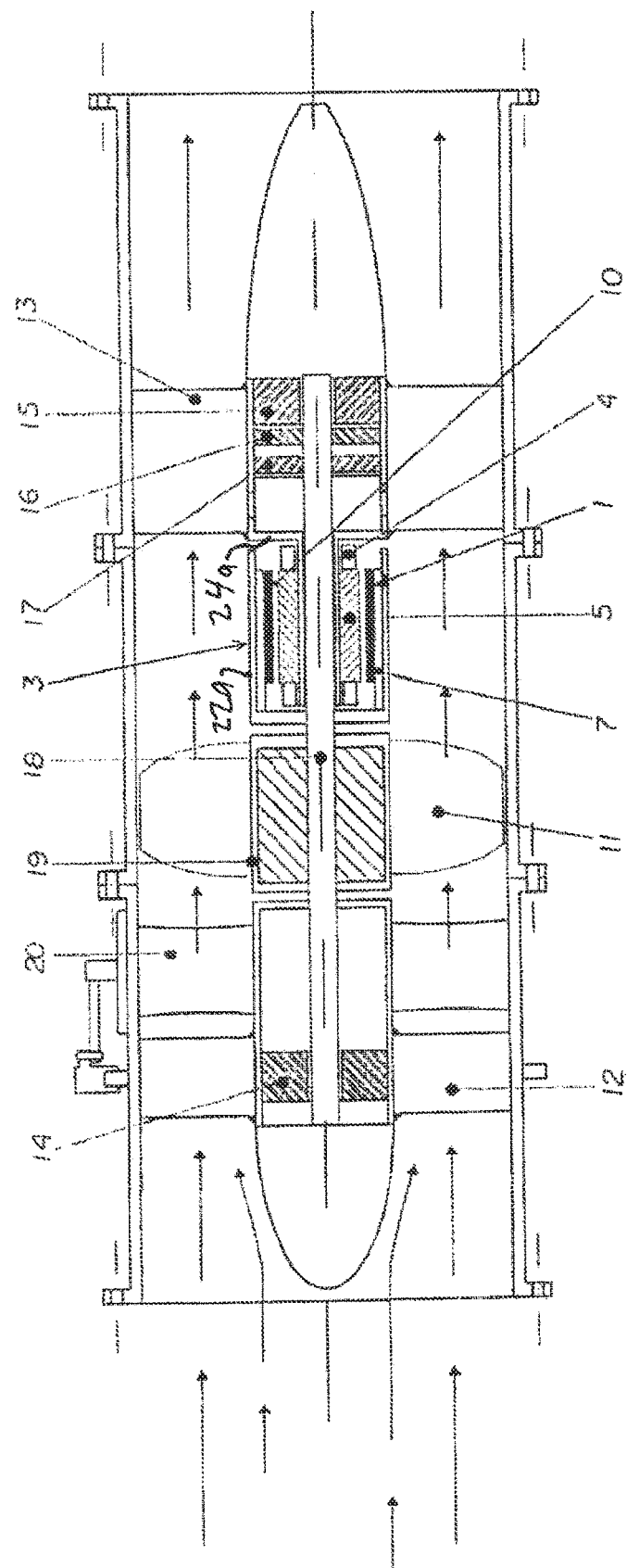
FIG. 10 represents a longitudinal cut of the equipment, illustrating the assembled components/Case B4: turbine and electrical generator rotor set bi-supported with the electrical generator solidary to the equipment shaft, being the shaft either a single part or composed of by sections interconnected by flanges, reels, sleeves, etc. and with permanent magnets in the internal diameter of the electrical generator rotor.
Figure 11:
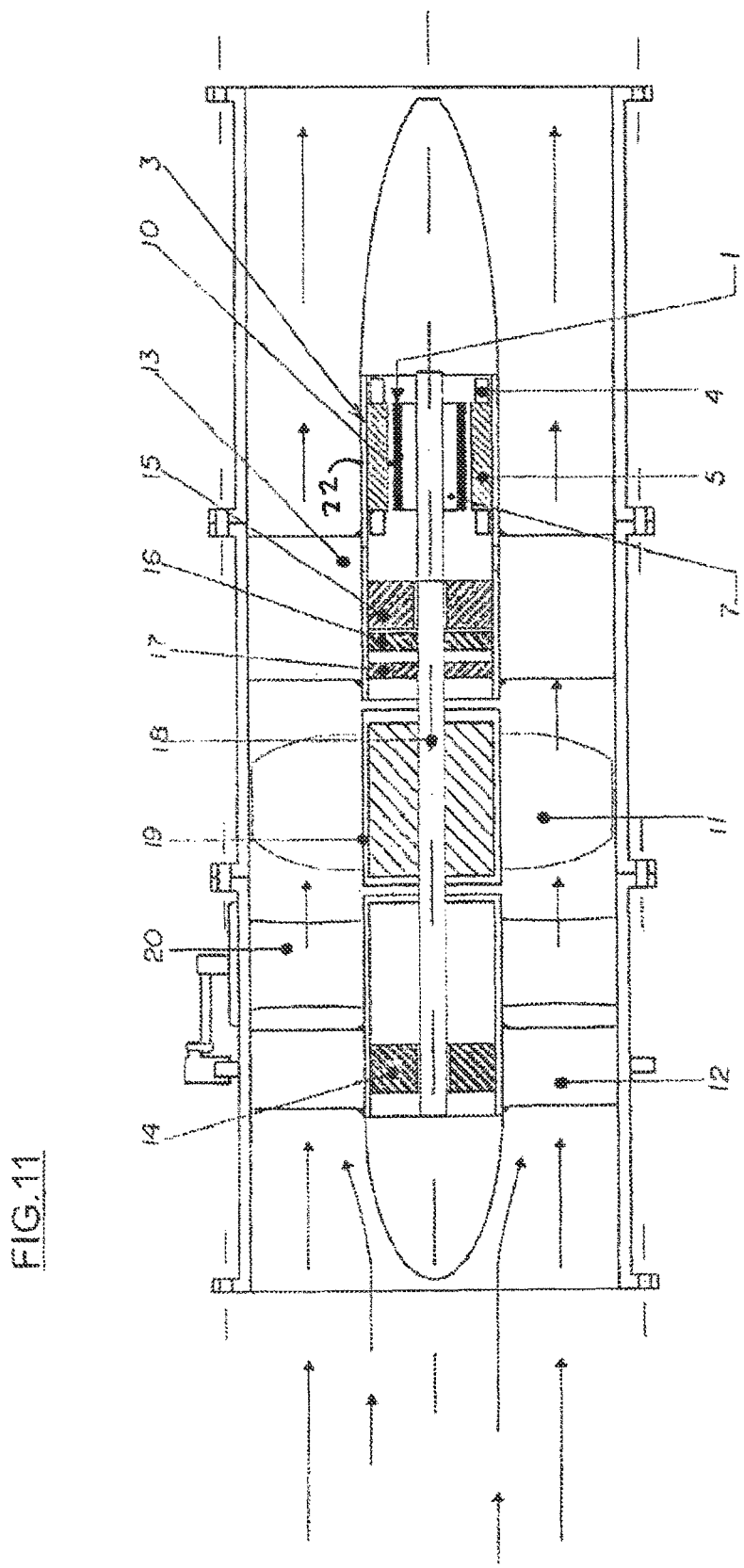
FIG. 11 represents a longitudinal cut of the equipment, Illustrating the assembled components/Case B5: The turbine is bi-supported and the electrical generator is in balance. Permanent magnets are in the external diameter of the electrical generator rotor.
Figure 12:
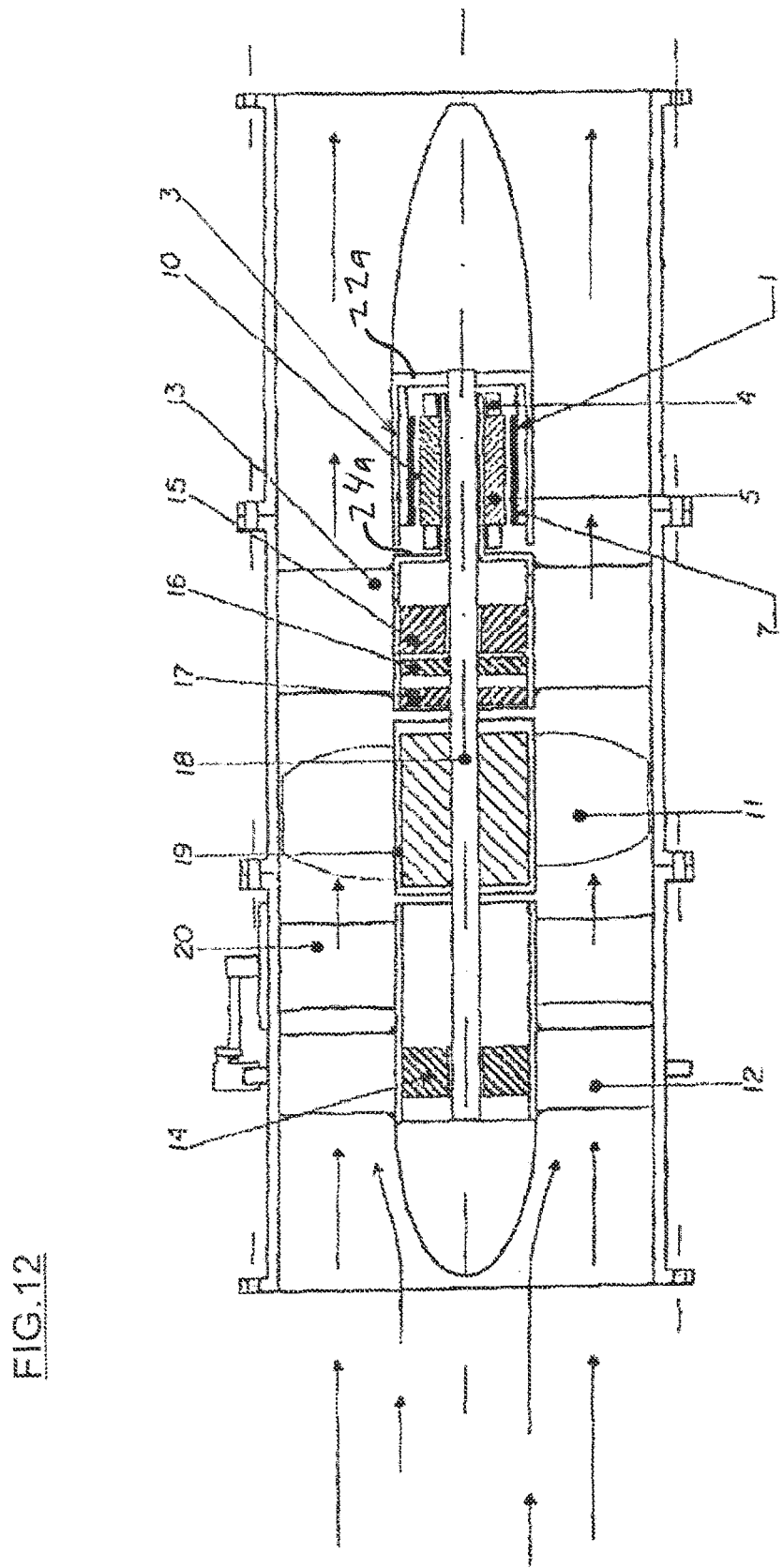
FIG. 12 represents a longitudinal cut of the equipment, Illustrating the assembled components/Case B6: The turbine is bi-supported and the electrical generator is in balance. The permanent magnets are in the internal diameter of the electrical generator rotor.
Figure 13:
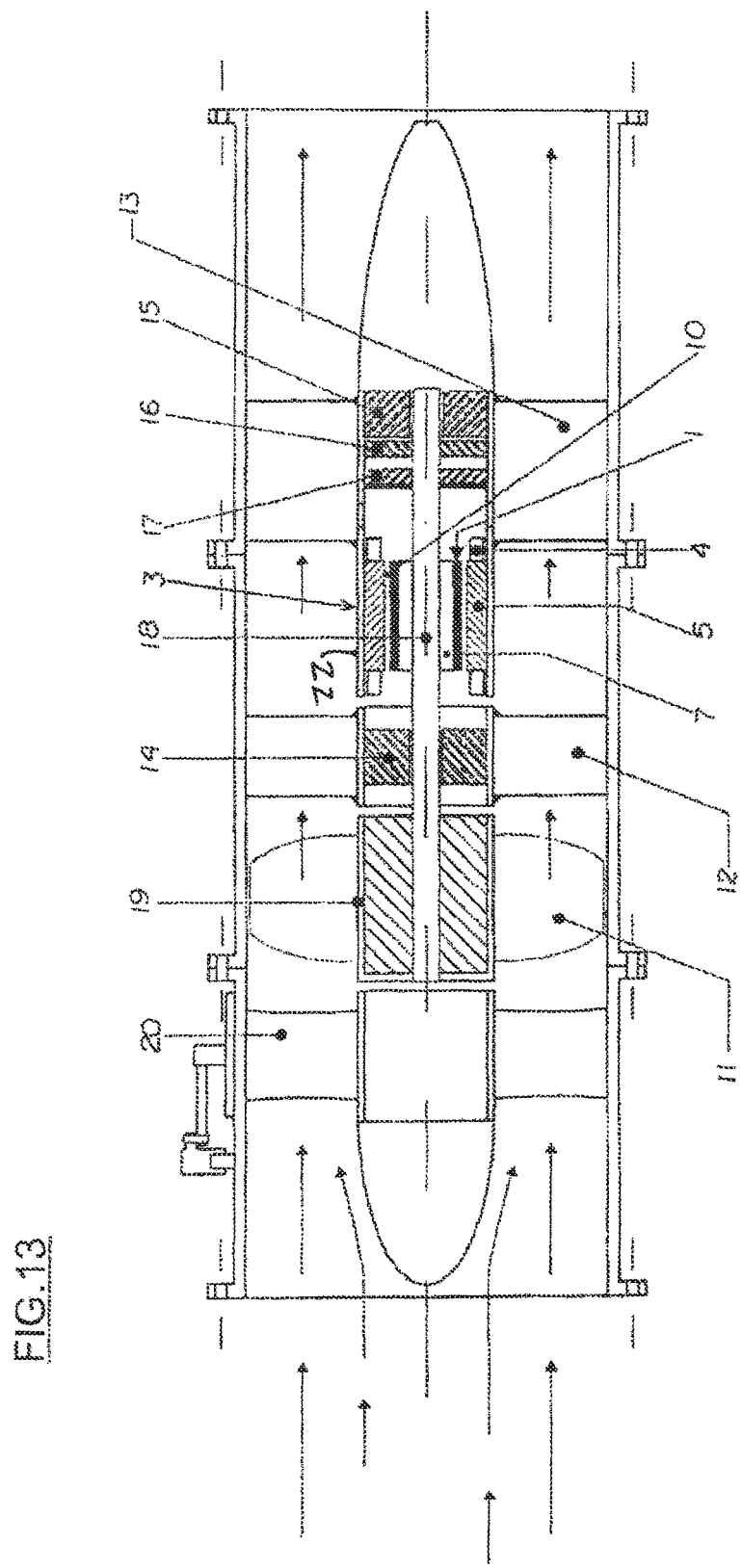
FIG. 13 represents a longitudinal cut of the equipment, Illustrating the components assembled/Case B7: The turbine is in balance, fixed to the equipment shaft projection, being the shaft either a single piece or composed of sections interconnected by flanges, spools, sleeves, etc. and the rotor of the electrical generator bi-supported with the permanent magnets located in the internal diameter of the electrical generator rotor.
Figure 14:
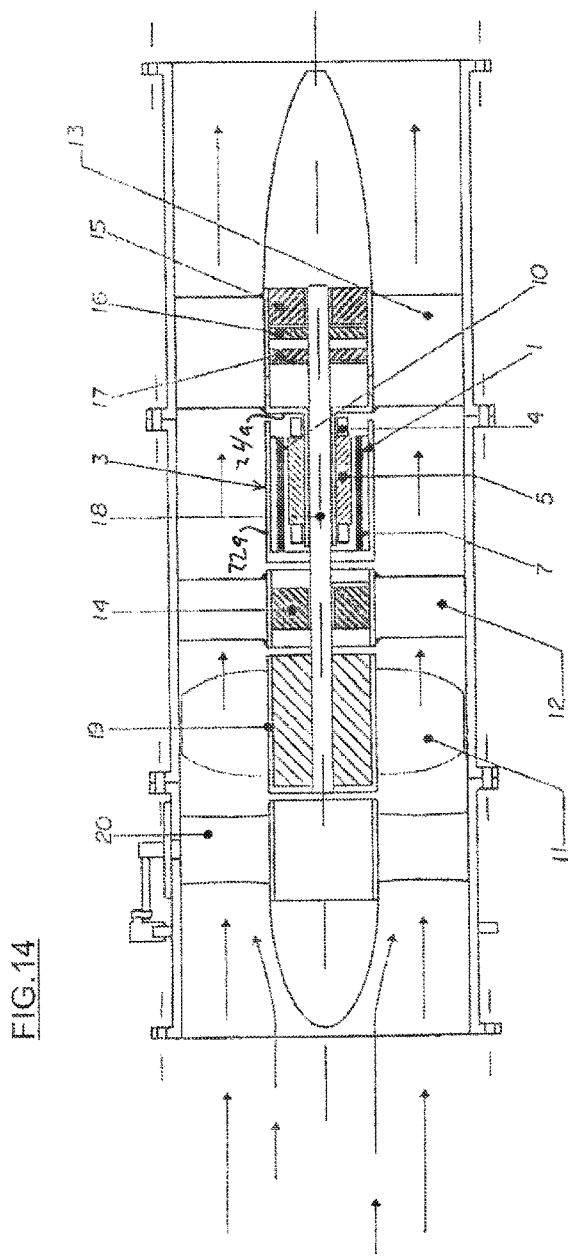
FIG. 14 represents a longitudinal cut of the equipment, Illustrating the assembled components/Case B8: the turbine is in balance, fixed to the projection of the equipment shaft, being the shaft and the equipment either a single piece or composed of sections interconnected by flanges, spools, sleeves, etc, and the rotor of the electrical generator is bi-supported with the permanent magnets located in the internal diameter of the electrical generator rotor; and Version B—Internal Generator Stator and External Generator Rotor.

The structure of the electrical energy generator equipment disclosed herein includes a forward crossbar (12) (FIGS. 7 to 14, 17, 18 and 19) and rearward crossbar (13) (figures from 7 to 14, 17,18 and 19), said forward crossbar being where the forward guiding bearing (14) is located (figures from 7 to 14,17, and 19) and said rearward crossbar being where said rear guiding bearing (15) is located (figures from 7 to 14,17, 18 and 19), and said rearward crossbar being the location of the thrust bearings (16) (figures from 7 to 14,17,18 and 19) and back- thrust bearings (17) (figures from 7 to 14,17,18 and 19). The thrust bearings and back thrust bearings may be associated with forward bearing (14) or rear bearing (15). Crossbar 20 is mounted rearward (downstream) of forward crossbar 12 in FIGS. 7-12 and upstream of the novel hydraulic turbine and generator. In FIGS. 13 and 14, forward crossbar 12 is positioned downstream of the turbine and upstream of the generator and crossbar 20 is positioned upstream of the turbine. The embodiment of FIG. 7 includes a non-rotating outer housing 22 mounted to rearward crossbar 13 and a rotating inner housing 24 that ensleeves shaft 18 and which is formed integrally with turbine hub 19 for conjoint rotation therewith. Stator 5 is secured to an interior surface of non-rotating outer housing 22 and rotor 7 is secured to the exterior surface of rotating inner housing 24. The embodiment of FIG. 8 includes a non-rotating inner housing 24*a* mounted to rearward crossbar 13 that ensleeves shaft 18 but which is spaced therefrom and does not rotate conjointly therewith. A rotating outer housing 22*a* is formed integrally with turbine hub 19 for conjoint rotation therewith. Stator 5 is secured to an external surface of non-rotating inner housing 24*a* and rotor 7 is secured to an internal surface of rotating outer housing 22a. The embodiment of FIG. 9 includes a non-rotating outer housing 22 secured to rearward crossbar 13 and stator 5 is secured to an internal surface of said non-rotating outer housing. Rotor 7 is secured to shaft 18 for conjoint rotation therewith. In the embodiment of FIG. 10, a non-rotating inner housing 24*a* that ensleeves shaft 18 but which is spaced therefrom and does not rotate conjointly therewith is secured to rearward crossbar 13 and a rotating outer housing 22*a* is secured to shaft 18 for conjoint rotation therewith. Stator 5 is secured to an external surface of non-rotating inner housing 24*a* and rotor 7 is secured to an interior surface of rotating outer housing 22*a*. In the embodiment of FIG. 11, a non-rotating outer housing 22 is secured to rearward crossbar 13 and stator 5 is secured to an interior surface of said non-rotating outer housing. Rotor 7 is secured to shaft 18 for conjoint rotation therewith. In the embodiment of FIG. 12 a non-rotating inner housing 24a that ensleeves shaft 18 but which does not rotate conjointly therewith is secured to rearward crossbar 13 and a rotating outer housing 22a is secured to the rearward end of shaft 18. Stator 5 is secured to an exterior surface of the non-rotating inner housing 24a and rotor 7 is secured to an interior surface of rotating outer housing 22a. In the embodiment of FIG. 13, turbine hub 19 is mounted downstream (rearward) of pre-distributor device 20 and generator 3 is mounted between forward crossbar 12 and rearward crossbar 13. Non-rotating outer housing 22 is secured to rearward crossbar 13 and stator 5 is secured to an interior surface of said non-rotating outer housing. Rotor 7 is secured to shaft 18 for conjoint rotation therewith. In the embodiment of FIG. 14, turbine hub 19 is mounted downstream (rearward) of pre-distributor device 20 and generator 3 is mounted between forward crossbar 12 and rearward crossbar 13. Non-rotating inner housing 24a that ensleeves shaft 18 but which does not rotate with respect thereto is secured to rearward crossbar 13 and rotatable outer housing 22a is secured to shaft 18 for conjoint rotation therewith. Stator 5 is secured to an external surface of non-rotatable inner housing 24a and rotor 7 is secured to an internal surface of rotatable outer housing 22a and thus rotates radially outwardly of said stator.

The bearings (16/17) may be sliding bearings or roller bearings, lubricated by water, grease, oil or dry.

The heat generated by mechanical friction in the bearings is transferred to the water flow; whenever bearings are lubricated by oil the heat dissipation may be carried out by using external heat exchangers.

The forward guiding bearing (14) and the rear guiding bearing (15) support the equipment shaft (18) figures from 7 to 14, 17, 18 and 19).

The arrangements of FIGS. 3 and 15 envisage that permanent magnets (1) be positioned on the surface of the generator rotor (7).

The arrangements of FIGS. 4 and 16 envisage that permanent magnets (1) positioned inserted in the generator rotor (7).

The hydraulic turbine may be Propeller or Kaplan type.

The blades (11) figures from 7 to 14,17, 18 and 19) of the hydraulic turbine (2) may be fixed, adjustable in the assemblage or controllable by means of mechanisms, hydraulic or electrical systems.

The equipment shaft (18) allows radial and longitudinal positioning of the set.

The turbine hub (cube) (19) figures from 7 to 14, 17, 18 and 19) may be cylindrical, spherical, elliptical, or any other shape that allows the pivoting of the blades (11).

Blades 11 of the hydraulic turbine are controllable, i.e., they pivot in relation to turbine hub 9.

The regulation of electrical tension and frequency are obtained by electronic, electromechanical or hydraulic external equipment.

The pre-distributor with regulating blades (11) contributes to improve the equipment efficiency in different load and flow conditions.

The electrical power generating equipment (2) and (3) may be positioned as follows:

as to individual positioning, such as:
a1=horizontal (perpendicular to the site surface vertical);
a2=aligned to site surface vertical
a3=inclined in relation to the site surface vertical;

as to the number of equipments in the same site: one or more equipment. The equipment for electrical energy generation (2) and (3) may be grouped as follows:
b1=In parallel, side by side horizontally, with the middle cross section plane of the turbine rotors perpendicular to the main water flow direction;
b2) one equipment over another vertically (also in parallel) with the middle cross section plans of turbine rotors perpendicular to the main water flow direction;
b3) serial positioned equipment (one equipment receiving the water output flow from the previous equipment)
b4) Combined in one or more modules, which can be switched on and off individually or in groups.

It is important to understand that the invention herein does not limit its application to the details and steps herein described. Such invention allows some other modalities and to be practiced or executed in various manners, being understood that the terminology used aims at description, rather than limitation.

What is claimed is:

1. An apparatus for generating electricity, comprising:
   a conduit having an open forward end and an open rearward end, said conduit adapted for water flow therethrough from said open forward end to said open rearward end;
   a shaft mounted within said conduit in substantially concentric relation to said conduit, said shaft having an axis of rotation substantially coincident with a longitudinal axis of symmetry of said conduit;
   a forward crossbar supporting a forward end of said shaft, said forward crossbar having opposite ends secured to said conduit;
   a rearward crossbar supporting a rearward end of said shaft, said rearward crossbar having opposite ends secured to said conduit;
   a hydraulic turbine secured to said shaft so that said shaft rotates conjointly with said hydraulic turbine when water flows through said conduit from said forward end to said rearward end;
   said hydraulic turbine having a hub and a plurality of blades formed integrally with said hub;
   a generator disposed rearward of said hydraulic turbine in axial alignment therewith;
   said hydraulic turbine and generator being immersed in water when water flows through said conduit, said water flow being substantially parallel to said axis of rotation of said shaft, said hydraulic turbine converting water flow into mechanical energy and said generator converting said mechanical energy into electrical energy;
   said generator including a rotor and a stator mounted for relative rotation therebetween, said rotor having a plurality of permanent magnets mounted thereon so that electricity is generated as said permanent magnets rotate relative to said stator; and
   a gap between said rotor and stator being filled with water when water flows through said conduit;
   said turbine hub having a rotating extension that forms a rotatable inner housing;
   said rotor mounted to an external surface of said rotatable inner housing;
   a non-rotatable outer housing mounted to said rearward crossbar;
   said stator mounted to an interior surface of said non-rotatable outer housing; and
   said stator mounted in encircling relation to said rotor.

2. The apparatus of claim 1, further comprising:
said permanent magnets being magnetized in a radial direction.

3. The apparatus of claim 2, further comprising:
said rotor having a plurality of slots formed therein;
each of said permanent magnets positioned in an associated slot.

4. An apparatus for generating electricity, comprising:
a conduit having an open forward end and an open rearward end, said conduit adapted for water flow therethrouqh from said open forward end to said open rearward end:
a shaft mounted within said conduit in substantially concentric relation to said conduit, said shaft having an axis of rotation substantially coincident with a longitudinal axis of symmetry of said conduit;
a forward crossbar supporting a forward end of said shaft, said forward crossbar having opposite ends secured to said conduit;
a rearward crossbar supporting a rearward end of said shaft, said rearward crossbar haying opposite ends secured to said conduit;
a hydraulic turbine secured to said shaft so that said shaft rotates conjointly with said hydraulic turbine when water flows through said conduit from said forward end to said rearward end;
said hydraulic turbine having a hub and a plurality of blades formed integrally with said hub;
a generator disposed rearward of said hydraulic turbine in axial alignment therewith;
said hydraulic turbine and generator being immersed in water when water flows through said conduit, said water flow being substantially parallel to said axis of rotation of said shaft, said hydraulic turbine converting water flow into mechanical energy and said generator converting said mechanical energy into electrical energy;
said generator including a rotor and a stator mounted for relative rotation therebetween, said rotor having a plurality of permanent magnets mounted thereon so that electricity is generated as said permanent magnets rotate relative to said stator;
a gap between said rotor and stator being filled with water when water flows through said conduit;
a rotatable outer housing formed integrally with said turbine hub;
a non-rotatable inner housing mounted to said rearward crossbar;
said rotor mounted to an internal surface of said rotatable outer housing;
said stator mounted on an external surface of said non-rotatable inner housing; and
said rotor encircling said stator.

5. An apparatus for generating electricity, comprising:
a conduit having an open forward end and an open rearward end, said conduit adapted for water flow therethrough from said open forward end to said open rearward end;
a shaft mounted within said conduit in substantially concentric relation to said conduit, said shaft having an axis of rotation substantially coincident with a longitudinal axis of symmetry of said conduit;
a forward crossbar supporting a forward end of said shaft, said forward crossbar having opposite ends secured to said conduit;
a rearward crossbar supporting a rearward end of said shaft, said rearward crossbar having opposite ends secured to said conduit;
a hydraulic turbine secured to said shaft so that said shaft rotates conjointly with said hydraulic turbine when water flows through said conduit from said forward end to said rearward end;
said hydraulic turbine having a hub and a plurality of blades formed integrally with said hub;
a generator disposed rearward of said hydraulic turbine in axial alignment therewith;
said hydraulic turbine and generator being immersed in water when water flows through said conduit, said water flow being substantially parallel to said axis of rotation of said shaft, said hydraulic turbine converting water flow into mechanical energy and said generator converting said mechanical energy into electrical energy;
said generator including a rotor and a stator mounted for relative rotation therebetween, said rotor having a plurality of permanent magnets mounted thereon so that electricity is generated as said permanent magnets rotate relative to said stator;
a gap between said rotor and stator being filled with water when water flows through said conduit;
a non-rotatable outer housing mounted to said rearward crossbar;
said stator mounted to an internal surface of said non-rotatable outer housing;
said rotor mounted to said shaft;
said stator mounted in encircling relation to said rotor.

6. An apparatus for generating electricity, comprising:
a conduit having an open forward end and an open rearward end, said conduit adapted for water flow therethrough from said open forward end to said open rearward end:
a shaft mounted within said conduit in substantially concentric relation to said conduit, said shaft having an axis of rotation substantially coincident with a longitudinal axis of symmetry of said conduit;
a forward crossbar supporting a forward end of said shaft, said forward crossbar having opposite ends secured to said conduit;
a rearward crossbar supporting a rearward end of said shaft, said rearward crossbar having opposite ends secured to said conduit;
a hydraulic turbine secured to said shaft so that said shaft rotates conjointly with said hydraulic turbine when water flows through said conduit from said forward end to said rearward end;
said hydraulic turbine having a hub and a plurality of blades formed integrally with said hub;
a generator disposed rearward of said hydraulic turbine in axial alignment therewith:
said hydraulic turbine and generator being immersed in water when water flows through said conduit, said water flow being substantially parallel to said axis of rotation of said shaft, said hydraulic turbine converting water flow into mechanical energy and said generator converting said mechanical energy into electrical energy;
said generator including a rotor and a stator mounted for relative rotation therebetween, said rotor having a plurality of permanent magnets mounted thereon so that electricity is generated as said permanent magnets rotate relative to said stator;
a gap between said rotor and stator being filled with water when water flows through said conduit;
an outer housing connected to said shaft for conjoint rotation therewith;
said rotor secured to an internal surface of said outer housing;

an inner housing mounted to said rearward crossbar, said inner housing ensleeving said shaft but not rotating; and said stator secured to an external surface of said inner housing.

7. An apparatus for generating electricity, comprising:

a conduit having an open forward end and an open rearward end, said conduit adapted for water flow therethrough from said open forward end to said open rearward end;

a shaft mounted within said conduit in substantially concentric relation to said conduit, said shaft having an axis of rotation substantially coincident with a longitudinal axis of symmetry of said conduit;

a forward crossbar supporting a forward end of said shaft, said forward crossbar having opposite ends secured to said conduit;

a rearward crossbar supporting a rearward end of said shaft, said rearward crossbar having opposite ends secured to said conduit;

a hydraulic turbine secured to said shaft so that said shaft rotates conjointly with said hydraulic turbine when water flows through said conduit from said forward end to said rearward end;

said hydraulic turbine having a hub and a plurality of blades formed integrally with said hub;

a generator disposed rearward of said hydraulic turbine in axial alignment therewith;

said hydraulic turbine and generator being immersed in water when water flows through said conduit, said water flow being substantially parallel to said axis of rotation of said shaft, said hydraulic turbine converting water flow into mechanical energy and said generator converting said mechanical energy into electrical energy;

said generator including a rotor and a stator mounted for relative rotation therebetween, said rotor having a plurality of permanent magnets mounted thereon so that electricity is generated as said permanent magnets rotate relative to said stator;

a gap between said rotor and stator being filled with water when water flows through said conduit;

a non-rotatable outer housing mounted to said rearward crossbar;

said stator secured to an internal surface of said non-rotatable outer housing;

said rotor mounted to said shaft for conjoint rotation therewith;

said stator encircling said rotor; and a thrust bearing mounted forward of said generator and rearward of said hydraulic turbine.

8. An apparatus for generating electricity, comprising:

a conduit having an open forward end and an open rearward end, said conduit adapted for water flow therethrough from said open forward end to said open rearward end:

a shaft mounted within said conduit in substantially concentric relation to said conduit, said shaft having an axis of rotation substantially coincident with a longitudinal axis of symmetry of said conduit;

a forward crossbar supporting a forward end of said shaft, said forward crossbar having opposite ends secured to said conduit;

a rearward crossbar supporting a rearward end of said shaft, said rearward crossbar having opposite ends secured to said conduit;

a hydraulic turbine secured to said shaft so that said shaft rotates conjointly with said hydraulic turbine when water flows through said conduit from said forward end to said rearward end;

said hydraulic turbine having a hub and a plurality of blades formed integrally with said hub;

a generator disposed rearward of said hydraulic turbine in axial alignment therewith;

said hydraulic turbine and generator being immersed in water when water flows through said conduit, said water flow being substantially parallel to said axis of rotation of said shaft, said hydraulic turbine converting water flow into mechanical energy and said generator converting said mechanical energy into electrical energy;

said generator including a rotor and a stator mounted for relative rotation therebetween, said rotor having a plurality of permanent magnets mounted thereon so that electricity is generated as said permanent magnets rotate relative to said stator;

a gap between said rotor and stator being filled with water when water flows through said conduit;

a rotatable outer housing mounted for conjoint rotation to said shaft at a rearward end of said shaft;

said rotor secured to an internal surface of said rotatable outer housing;

a non-rotatable inner housing mounted to said rearward crossbar, said non-rotatable inner housing ensleeving said shaft but not rotating therewith;

said stator mounted to an external surface of said non-rotatable inner housing;

said rotor disposed in encircling relation to said stator.

9. An apparatus for generating electricity, comprising:

a conduit having an open forward end and an open rearward end, said conduit adapted for water flow therethrough from said open forward end to said open rearward end:

a shaft mounted within said conduit in substantially concentric relation to said conduit, said shaft having an axis of rotation substantially coincident with a longitudinal axis of symmetry of said conduit;

a forward crossbar supporting a forward end of said shaft, said forward crossbar having opposite ends secured to said conduit;

a rearward crossbar supporting a rearward end of said shaft, said rearward crossbar having opposite ends secured to said conduit;

a hydraulic turbine secured to said shaft so that said shaft rotates conjointly with said hydraulic turbine when water flows through said conduit from said forward end to said rearward end;

said hydraulic turbine having a hub and a plurality of blades formed integrally with said hub;

a generator disposed rearward of said hydraulic turbine in axial alignment therewith;

said hydraulic turbine and generator being immersed in water when water flows through said conduit, said water flow being substantially parallel to said axis of rotation of said shaft, said hydraulic turbine converting water flow into mechanical energy and said generator converting said mechanical energy into electrical energy;

said generator including a rotor and a stator mounted for relative rotation therebetween, said rotor having a plurality of permanent magnets mounted thereon so that electricity is generated as said permanent magnets rotate relative to said stator;

a gap between said rotor and stator being filled with water when water flows through said conduit;

said turbine mounted forwardly of said forward crossbar;
said generator mounted between said forward crossbar and said rearward crossbar;
a non-rotatable outer housing mounted on said rearward crossbar;
said stator secured to an internal surface of said non-rotatable outer housing;
said rotor mounted to said shaft for conjoint rotation therewith; and
said stator disposed in encircling relation to said rotor.

10. An apparatus for generating electricity, comprising:
a conduit having an open forward end and an open rearward end, said conduit adapted for water flow therethrough from said open forward end to said open rearward end;
a shaft mounted within said conduit in substantially concentric relation to said conduit, said shaft having an axis of rotation substantially coincident with a longitudinal axis of symmetry of said conduit;
a forward crossbar supporting a forward end of said shaft, said forward crossbar having opposite ends secured to said conduit;
a rearward crossbar supporting a rearward end of said shaft, said rearward crossbar having opposite ends secured to said conduit;
a hydraulic turbine secured to said shaft so that said shaft rotates conjointly with said hydraulic turbine when water flows through said conduit from said forward end to said rearward end;
said hydraulic turbine having a hub and a plurality of blades formed integrally with said hub;
a generator disposed rearward of said hydraulic turbine in axial alignment therewith;
said hydraulic turbine and generator being immersed in water when water flows through said conduit, said water flow being substantially parallel to said axis of rotation of said shaft, said hydraulic turbine converting water flow into mechanical energy and said generator converting said mechanical energy into electrical energy;
said generator including a rotor and a stator mounted for relative rotation therebetween, said rotor having a plurality of permanent magnets mounted thereon so that electricity is generated as said permanent magnets rotate relative to said stator;
a gap between said rotor and stator being filled with water when water flows through said conduit;
said turbine mounted forwardly of said forward crossbar;
said generator mounted between said forward crossbar and said rearward crossbar;
a non-rotatable inner housing mounted to said rearward crossbar, said non-rotatable inner housing ensleeving said shaft but not rotating therewith;
said stator secured to an external surface of said non-rotatable inner housing;
a rotatable outer housing secured to and conjointly rotatable with said shaft;
said rotor mounted to an internal surface of said rotatable outer housing; and
said rotor encircling said stator.

* * * * *